United States Patent [19]
Heide

[11] Patent Number: 5,433,302
[45] Date of Patent: Jul. 18, 1995

[54] ACCESSIBLE VARIABLE TUNED DAMPER ASSEMBLY FOR OPTICAL TABLE TOPS

[75] Inventor: Ulf B. Heide, Marblehead, Mass.

[73] Assignee: Technical Manufacturing Corporation, Peabody, Mass.

[21] Appl. No.: 19,212

[22] Filed: Feb. 18, 1993

[51] Int. Cl.$^6$ .................................................. F16F 7/10
[52] U.S. Cl. ...................................... 188/378; 188/285; 248/566
[58] Field of Search ........................... 188/378–380, 188/322.5, 285, 299; 267/140.11, 140.2; 248/566, 631; 359/391; 73/430, 496, 522

[56] References Cited

U.S. PATENT DOCUMENTS

| | | | |
|---|---|---|---|
| 1,863,144 | 6/1932 | Wile | 188/285 X |
| 3,690,414 | 9/1972 | Aggarwal et al. | 188/378 |
| 3,917,201 | 11/1975 | Roll | 248/631 X |
| 4,019,389 | 4/1977 | LaSala et al. | 188/276 X |
| 4,575,203 | 3/1986 | Brandt et al. | 267/140.2 X |
| 4,976,415 | 11/1990 | Murai et al. | 188/378 X |
| 5,141,064 | 8/1992 | Willemsen et al. | 188/285 X |

FOREIGN PATENT DOCUMENTS

| | | | |
|---|---|---|---|
| 0050478 | 4/1977 | Japan | 188/378 |
| 0025543 | 2/1982 | Japan | 188/378 |
| 0274134 | 12/1986 | Japan | 73/430 |

*Primary Examiner*—Josie A. Ballato
*Attorney, Agent, or Firm*—Samuels, Gauthier & Stevens

[57] ABSTRACT

An optical tabletop which has dampers located in the corners of an optical tabletop are each a suspended mass through which passes threaded rods. The suspended mass is submerged in a viscous liquid. Adjustment of the rods allows the optical tabletop to be tuned.

6 Claims, 3 Drawing Sheets

ACCESSIBLE VARIABLE TUNED DAMPER ASSEMBLY FOR OPTICAL TABLE TOPS

BACKGROUND AND SUMMARY OF THE INVENTION

Prior art optical tops are traditionally made with internal mass-spring dampers to control structural resonances. These mass-springs are tuned, when the optical tops are assembled, to the primary bending freguencies of the optical tops. Energy is dissipated when the mass-spring assemblies are submerged in a viscous fluid.

This structure works well for optical tops that are lightly loaded. When a heavy load is applied to such optical tops, the apparent primary bending frequency is reduced and the built-in dampers are no longer tuned for maximum effect.

When two or more standard optical tops are bolted together, the standard individual unit dampers do not work well.

Traditional bolted or welded together optical tops are made without internal dampers until the tops have been bolted together. Then the assembled structure is tested and new, lower frequency dampers will be assembled in the finished table assembly. Again, to work at peak performance levels, those joined table structures must be used in the assembled state. If these assembled tops are taken apart, then the unit dampers do not work well.

Broadly the invention comprises an optical top or vibration isolated structure which has at least one accessible variable damper secured to the optical top. The damper is located such that it may be tuned without either disassembly of the top at the site or it can be returned to the manufacturer for disassembly and retuning.

The invention utilizes an accessible adjustable mass damper that can be tuned to one or more frequencies by the user as requirements change. Accessible is used in the sense that the damper can be adjusted without disassembling the optical table, i.e. removing the top and/or bottom-plates and/or the sides.

If a particularly heavy load is applied to an optical top reducing the resonant frequency, the adjustable damper's natural frequency is reduced by tuning the variable damper and peak performance is maintained. If two perfectly tuned tables are bolted together to form a unitary assembly, then again, the variable damper (or dampers) is adjusted to coincide with the new, lower structural frequencies of the assembly.

In a preferred embodiment of the invention, the optical table top has four dampers. The dampers in the optical table can be set up such that all four dampers are adjustable or some may be fixed while the rest are adjustable. At least one damper must be adjustable but, there is no limit to the number of dampers used. Where four dampers are used, they are preferably located at the corners of the optical top. In the preferred embodiment, threaded rods are used to adjust and lock a suspended mass which is submerged in a viscous liquid.

DESCRIPTION OF THE PREFERRED EMBODIMENT(S)

Figure 1:
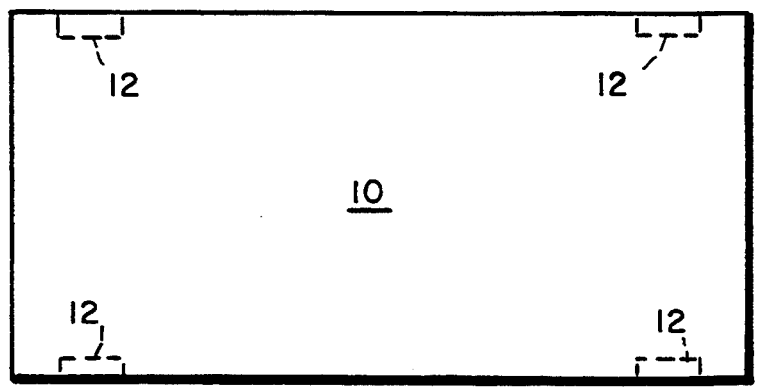
FIG. 1 is a plan view of an optical table top embodying the invention.
Figure 2:
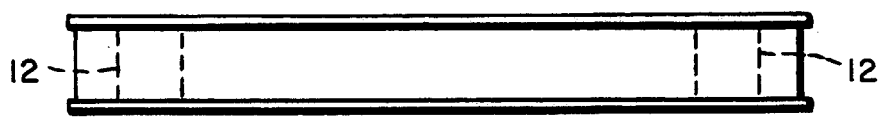
FIG. 2 is a side elevation of FIG. 1.

Referring to FIGS. 1 or 2, an optical table top is shown generally at 10 and has located in the side walls at the ends thereof rectangular-shaped recesses or pockets 12.

Figure 3:
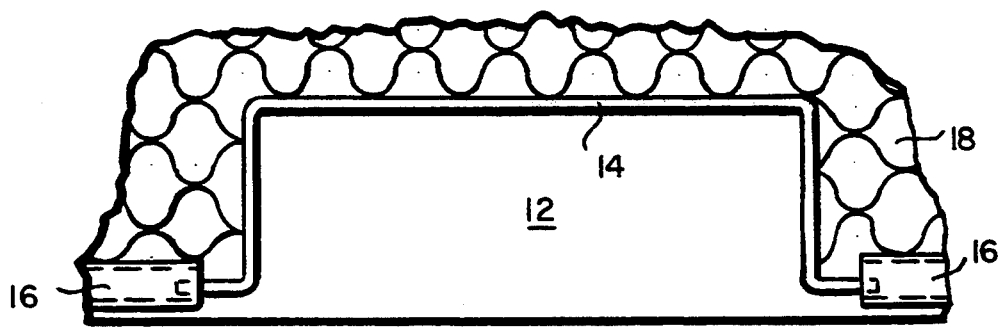
FIG. 3 is a plan view of a pocket of the table shown in greater detail.

Referring to FIG. 3, a pocket 12 is shown in greater detail and comprises a U-shaped side wall 14, recessed into the optical top 10 and joined to sides 16 of the optical top 10. A honeycomb core is shown at 18.

Figure 4:
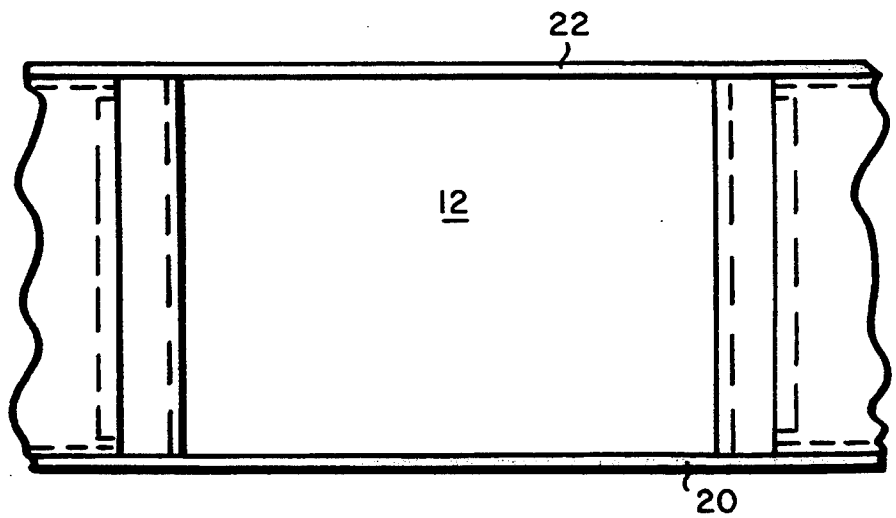
FIG. 4 is a side elevational view of the pocket of FIG. 3.
Figure 5:
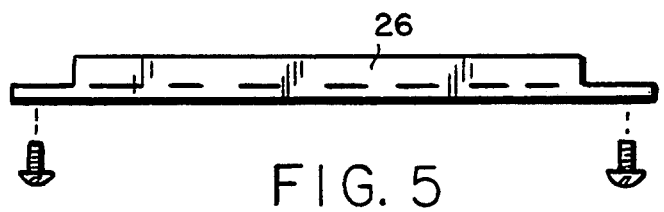
FIG. 5 is a plan view of a cover used in combination with the pocket.

Referring to FIG. 4, the bottom of the pocket 12 is the bottom 20 of the optical top 10. The top of the pocket 12 is formed by the top 22 of the optical top 10. A cover 26, shown in FIG. 5, is adapted to be secured to the side 16 of the optical top 10 to close the pocket 12.

Figure 6:
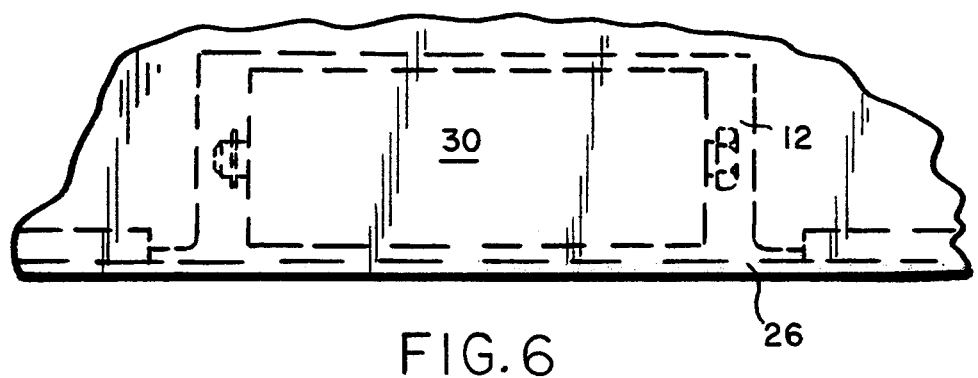
FIG. 6 is a plan view of a damper received in a pocket.

Referring to FIG. 6, a plan view of a pocket 12 is shown having a damper 30 received therein. The cover 26 is shown in place.

Figure 7:
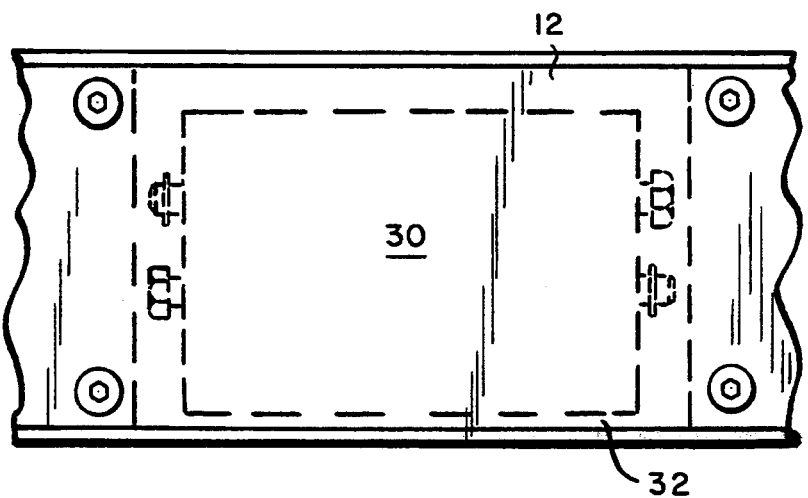
FIG. 7 is a side elevational view of FIG. 6.

Referring to FIG. 7, the damper 30 is shown secured in the pocket 12 by a layer 32 of epoxy adhesive.

Figure 8:
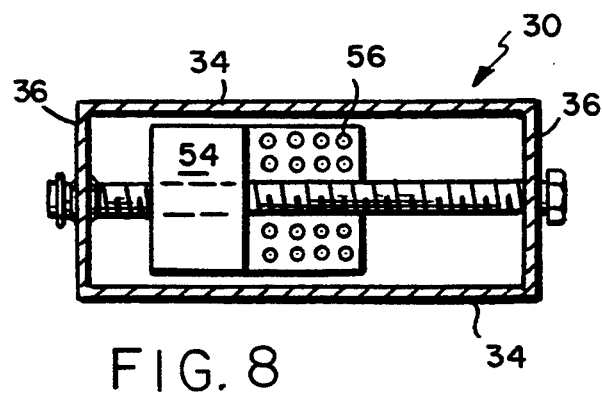
FIG. 8 is a plan view of a damper without a top.
Figure 9:
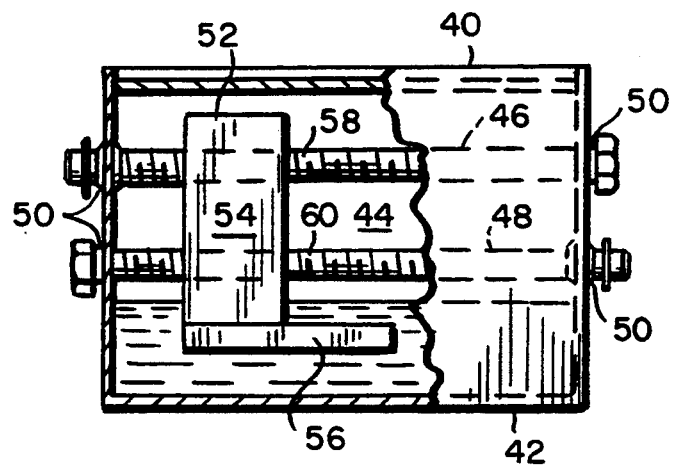
FIG. 9 is a side elevational view of FIG. 8 with the side wall partially broken away.
Figure 10:
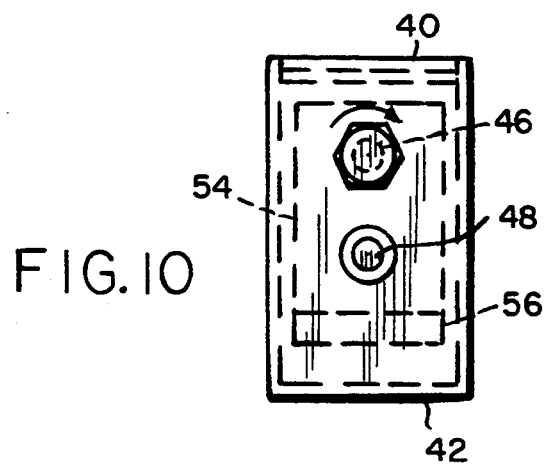
FIG. 10 is an end view of FIG. 8.

The damper assembly 30 is shown in greater detail in FIGS. 8, 9 and 10.

Referring to FIGS. 8 and 9, the damper 30 comprises side walls 34, end walls 36 and top and bottom walls 40 and 42 respectively to define a sealed chamber 44. Passing through the chamber 44 are threaded adjusting rods 46 and 48. 0-rings 50 are used in the walls 36 where the threaded rods 46 and 48 pass through. Threadingly engaged to the rods 46 and 48 is a mass paddle 52 comprising a block 54 joined to an optional apertured plate 56. The block 54 is characterized by tapped holes 58 and 60 through which the rods 46 and 48 are threaded in opposite directions.

The determination of the resonant frequencies of an optical top whether used as designed, used with additional loads and/or when combined with other optical tops is well within the skill of the art.

Figure 11:
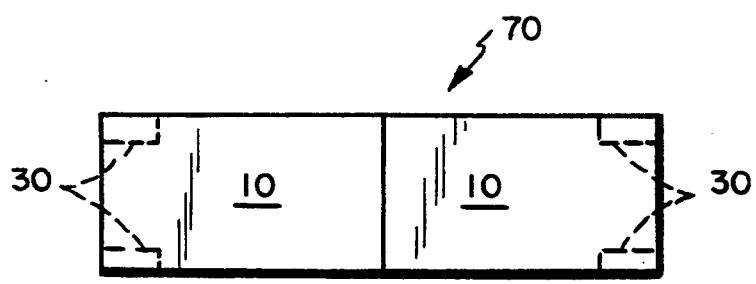
FIG. 11 is a plan view of two assembled optical table tops.

As shown in FIG. 11, two optical tops 10 embodying the invention are bolted end to end to form an extended optical top 70. The optical tops 10, individually, may have a primary resonant frequency of approximately 135 Hz and higher frequencies at other bending modes. The extended optical top 70 may have a primary resonant frequency of 55 Hz. At least one of the dampers 30, shown in dotted lines, at the four corners of the extended optical tops 10 is tuned to 55 Hz. The other dampers 30 at the interface (not shown) may be tuned to coincide with other modal frequency characteristics of the optical top.

Referring to FIGS. 8, 9 and 10, to tune a damper 30, the cover 26 is removed. Using a standard accelerometer (not shown), the resonant frequency of the damper 30 is read. The threaded rod 46 is rotated while the threaded rod 48 is rotated, moving the mass paddle 52 within the viscous liquid. When the proper resonant frequency is reached, the rod 48 is counter-rotated to lock the mass paddle in position. For the example described herein, a preferred volume for a chamber would be approximately 300 in$^3$. A suitable damping liquid would be, e.g. STP or any high viscosity oil. The mass of the paddle would be about 20 pounds.

Basically, the choice of which dampers are tuned and to what frequencies is the choice of the user. This can vary depending upon the configuration of joined tops and/or the load carried by the top. The dampers embodying the invention can be designed to be tuned to frequencies between 20 Hz to 250 Hz.

Alternate designs could use adjustable length leaf springs or adjustable preloaded, metal or elastomer springs.

In lieu of measuring the resonance of each damper, a calibration chart can be used which will enable users to predict the frequency of each damper depending on the measured frequency of the optical table.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

What is claimed is:

1. In an optical table top which table top has resonant bending frequencies, the improvement which comprises:
    an accessible variable tuned damper secured to the table top, said assembly comprising a sealed chamber, damping liquid and an adjustable damper received in the sealed chamber and wherein the adjustable damper comprises:
        a mass having a block and a lower plate, the mass having first and second threaded holes extending therethrough;
        first and second threaded rods which engage in opposite directions the first and second threaded holes respectively;
        means to rotate the threaded rods to move and lock the mass to tune the damper assembly to at least a primary bending frequency of the table top.

2. The table top of claim 1 which comprises side walls and the damper is received within the side walls.

3. The table top of claim 2 wherein the table top is substantially rectangular in shape and at least one damper is secured within a side wall at one end of the table top.

4. The table top of claim 1 wherein there is at least one said damper assembly received in each of two diagonally opposed corners of the table top.

5. The table top of claim 1 wherein the plate is characterized by a plurality of apertures.

6. The table top of claim 1 wherein the damper assembly is configured to tune the table top in a range of 20 Hz to 250 Hz.

* * * * *